(12) United States Patent
Holness et al.

(10) Patent No.: US 9,203,644 B2
(45) Date of Patent: Dec. 1, 2015

(54) ENABLING AN ETHERNET RING NETWORK TO SCALABLY SUPPORT A HUB-AND-SPOKE CONNECTIVITY MODEL

(75) Inventors: Marc Holness, Nepean (CA); Abdullah Bashar, Ottawa (CA); Marc-Andre Rochon, Gatineau (CA)

(73) Assignee: Ciena Corporation, Hanover, MD (US)

( * ) Notice: Subject to any disclaimer, the term of this patent is extended or adjusted under 35 U.S.C. 154(b) by 965 days.

(21) Appl. No.: 12/420,970

(22) Filed: Apr. 9, 2009

(65) Prior Publication Data
US 2010/0260196 A1    Oct. 14, 2010

(51) Int. Cl.
| H04L 12/28 | (2006.01) |
|---|---|
| H04L 12/46 | (2006.01) |
| H04L 12/427 | (2006.01) |
| H04L 12/701 | (2013.01) |
| H04L 12/42 | (2006.01) |
| H04L 12/931 | (2013.01) |
| H04L 12/935 | (2013.01) |
| H04L 12/751 | (2013.01) |

(52) U.S. Cl.
CPC ............ *H04L 12/4641* (2013.01); *H04L 12/42* (2013.01); *H04L 12/427* (2013.01); *H04L 45/00* (2013.01); *H04L 49/3009* (2013.01); *H04L 49/351* (2013.01); *H04L 45/02* (2013.01)

(58) Field of Classification Search
CPC .............. H04L 12/462; H04L 12/4658; H04L 12/4662
USPC ........... 370/404, 258, 254, 392, 403; 709/238
See application file for complete search history.

(56) References Cited

U.S. PATENT DOCUMENTS

| 2002/0141421 A1* | 10/2002 | Dupont .......................... 370/403 |
|---|---|---|
| 2003/0074469 A1* | 4/2003 | Busi et al. ...................... 709/238 |
| 2005/0220096 A1 | 10/2005 | Friskney et al. |
| 2006/0109802 A1* | 5/2006 | Zelig et al. ..................... 370/258 |
| 2007/0076719 A1* | 4/2007 | Allan et al. .................... 370/392 |
| 2008/0095047 A1 | 4/2008 | Skalecki et al. |
| 2010/0208615 A1* | 8/2010 | Soon et al. ..................... 370/254 |

OTHER PUBLICATIONS

Written Opinion of the International Searching Authority from corresponding PCT application PCT/CA2010/000291.
Sofia "A Survey of Advanced Ethernet Forwarding Approaches" IEEE Communications Surveys, IEEE, New York, NY, US, Sep. 2, 2009, ISSN 1553-877X, vol. 11, No. 1, pp. 92-115, XP011252848.

* cited by examiner

*Primary Examiner* — Brian O'Connor
*Assistant Examiner* — Lionel Preval
(74) *Attorney, Agent, or Firm* — Clements Bernard PLLC; Christopher L. Bernard; Lawrence A. Baratta, Jr.

(57) ABSTRACT

A unique RVID is used for each spoke node to identify traffic flowing from that spoke node to the hub and from the hub to the spoke. Spoke nodes perform MAC learning on any frame containing their assigned unique RVID and only bridge traffic received on the ring to a client port if the traffic contains their assigned RVID. Thus, MAC learning at the spoke is localized to client routes, or to routes of interest that pass through the hub. The hub node learns C-VID/RVID-ringport bindings for traffic on the ring. When a frame is received on the ring, the hub will use the C-VID and RVID to determine the I-SID and forward the traffic onto the external network. When a frame is received from the external network, the hub node will use the I-SID & C-VID to determine the RVID of the spoke node, and then use the C-VID & RVID to determine, from its forwarding database, which ringport should be used to output the frame.

20 Claims, 5 Drawing Sheets

ENABLING AN ETHERNET RING NETWORK TO SCALABLY SUPPORT A HUB-AND-SPOKE CONNECTIVITY MODEL

TECHNICAL FIELD

The present invention relates to Ethernet networks and, more particularly, to a method and apparatus for enabling an Ethernet ring network to scalably support a hub-and-spoke connectivity model.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information associated with routing information should be exchanged between the network elements.

Ethernet is a well known networking protocol that has been defined by the Institute of Electrical and Electronics Engineers (IEEE) as standards 802.1 and 802.3. Conventionally, Ethernet has been used to implement networks in enterprises such as businesses and campuses, and other technologies have been used to transport network traffic over longer distances. As the Ethernet standards have evolved over time, Ethernet has become more viable as a long distance transport technology as well.

FIG. 1 shows several fields that have been added to the Ethernet standard over time. As shown in FIG. 1, the original Ethernet frame format specified by IEEE 802.1 includes a source address (C-SA) and a destination address (C-DA). IEEE 802.1Q added a Customer VLAN tag (C-Tag) which includes an Ethertype, Tag Control Information (TCI) information, and customer VLAN ID (C-VID). IEEE 802.1ad added a provider VLAN tag (S-Tag), which also includes an Ethertype, TCI information, and subscriber VLAN ID. The C-Tag allows the customer to specify a VLAN, while the S-Tag allows the service provider to specify a VLAN on the service provider's network for the frame. These tags also allow the customer and subscriber to specify other aspects which are not relevant to an understanding of the contribution disclosed herein. When a network is implemented using 802.1ad it may be referred to as Q in Q encapsulation or Provider Bridging (PB). A domain implemented using this Ethernet standard will be referred to as a Provider Bridging (PB) domain.

The Ethernet standard has evolved to also allow for a second encapsulation process to take place as specified in IEEE 802.1ah. Specifically, an ingress network element to a service provider's network may encapsulate the original Ethernet frame with an outer MAC header including a destination address on the service provider's network (B-DA), a source address on the service provider's network (B-SA), a VLAN ID (B-VID) and a service instance tag (I-SID). The combination of the customer MAC addresses (C-SA and C-DA) and the I-SID are commonly referred to as the I-Tag. A domain implemented using this Ethernet standard will be referred to as a Provider Backbone Bridging (PBB) domain.

802.1Q, 802.1ad, and 802.1ah all use one or more spanning tree instances in the control plane to determine which links should be active and which should be blocked to prevent the formation of loops. An Ethernet network domain that implements one or more spanning trees on the control plane will be referred to herein as a spanning tree controlled Ethernet network domain.

Since a spanning tree requires all data to flow on particular selected links on the network, the network links that are part of the spanning tree may experience congestion. IEEE 802.1Qay was developed to allow traffic engineered paths to be defined on the network so that traffic could be forwarded over links not forming part of the spanning tree. IEEE 802.1Qay specifies a way for network elements on an Ethernet network domain to switch traffic based on the B-DA and B-VID rather than just forwarding the traffic according to the B-DA. The header of the frames forwarded on an Ethernet network established using this technology is not changed, but the manner in which the header information is used is changed, to allow forwarding to take place in a different manner. A network domain that forwards traffic using this forwarding paradigm will be referred to as Provider Backbone Bridging-Traffic Engineering (PBB-TE or PBT) network. PBT networks allow traffic engineered paths (trunks) to be established so that traffic can follow specified paths through the network rather than being required to follow the links that have been selected to be part of the spanning tree. The spanning tree is still used to forward control frames, however.

Network nodes may be logically or physically arranged many different ways. One common way to arrange or interconnect network elements is to interconnect them in a ring, for example as shown in FIG. 2. Closed loops, such as the loop shown in FIG. 2 may exist in isolation or may exist as a logical ring within a larger mesh network. The techniques described herein may be used wherever a set of Ethernet nodes is interconnected, logically or physically, to construct a closed loop network topology. For example, in a communication network having a mesh configuration, it is possible to form a logical ring by selecting nodes 12 from the mesh that interconnect to form a closed loop network topology.

In the example shown in FIG. 2, the ring 10 includes nodes 12, which are interconnected by links 14. In the example shown in FIG. 2, each node has a pair of 802.3 MAC interfaces 16 and an 802.1 bridge relay 18. 802.3 is another protocol established by the IEEE to define the Ethernet link layer. A control entity 20 is used to allow the network elements to exchange forwarding information and other control information, and is used by the network element to control how the data plane handles the data on the network. For example, the control entity enables the node to participate in the spanning tree. A switch may have more than one bridge relay and control entity. In this type of switch, the bridge relay/control entity that handles client MAC addresses is commonly referred to as the C-Component or "C-COMP", and the bridge relay/control entity that handles provider MAC addresses and adds the B-header is commonly referred to as the B-Component or "B-Comp".

One protocol designed to be used in Ethernet rings, such as the ring of FIG. 2, is defined as ITU-T SG15/Q9, G.8032. This protocol specifies the protection and recovery switching protocol for use on an Ethernet ring network. Briefly, when Ethernet nodes are interconnected in a closed loop architecture, the nodes may be allowed to collectively run a separate control plane to control how data is passed between the nodes on the ring. The control plane on the closed loop selects one of the nodes to be a root node to provide for blocking of traffic flowing on the ring. This prevents traffic from endlessly looping on the ring. Additionally, the control plane provides for failure detection on the closed loop, notification of the failure to the nodes on the closed loop, and how connectivity can be restored to enable the closed loop to recover from failure. One aspect of the control protocol is that, upon failure in the closed loop, a fault indication message will be transmitted on the ring. The fault indication message, amongst other things, causes the bridging nodes on the ring to flush their forwarding databases associated with the ring, so that the nodes can re-learn MAC addresses on the ring.

One Ethernet ring solution that uses the underlying G.8032 protection protocol is described in greater detail in U.S. patent application Ser. No. 12/027,942, entitled Method And Apparatus For Controlling A Set Of Ethernet Nodes Interconnected To Form One Or More Closed Loops, filed Feb. 7, 2008. As extensions to this basic ring control protocol, U.S. patent application Ser. No. 12/344,355 entitled Interworking An Ethernet Ring Network With a Spanning Tree Controlled Ethernet Network, filed on Dec. 26, 2008, describes a way for an Ethernet Ring Network to be dual homed to an Ethernet network running a spanning tree in the control plane. Likewise, U.S. patent application Ser. No. 12/344,362, entitled Interworking An Ethernet Ring Network With a an Ethernet Network with Traffic Engineered Trunks, filed on Dec. 26, 2008, describes a way for an Ethernet Ring Network to be dual homed with a network implementing traffic engineered trunks, i.e. a network implemented using 802.1Qay. Each of these patents is incorporated herein by reference.

U.S. patent application Ser. No. 12/027,942, filed Feb. 7, 2008, describes a way in which both meshed connectivity and hub-and-spoke connectivity may be implemented on the ring network. In meshed connectivity, each node may communicate directly with each other node on the ring. In hub-and-spoke connectivity, communication between the nodes is restricted such that the hub node can talk to each of the spoke nodes, and each of the spoke nodes can talk to the hub node, but the spoke nodes cannot talk directly with each other. This type of connectivity is advantageous for applications such as Internet access, video distribution, DLSAM backhaul, e-line services, etc.

In the previous hub-and-spoke solution, one RVID value was used by all spoke nodes to transmit frames to the hub, and a second RVID value was used by the hub to transmit frames to the spokes. Spoke nodes would only process (e.g., remove) data frames from the ring if they contained an RVID value indicating they were transmitted by the hub node, and the hub node would process data frames containing an RVID value indicating that they were transmitted by one of the spokes. Unfortunately, although this enabled hub-and-spoke connectivity to be implemented, it required the hub node to perform MAC learning on routes extending through each of the spokes, which caused scalability issues at the hub node. Accordingly, it would be advantageous to provide a more scalable way for hub-and-spoke connectivity to be implemented on an Ethernet ring network.

SUMMARY

According to an embodiment of the invention, each of the spoke nodes on the ring uses a unique RVID to identify traffic transmitted by it to the hub. The hub uses the same RVID that has been assigned to a particular spoke to transmit traffic to that associated spoke. The hub node will process any frame tagged with one of its spoke nodes' RVIDs, and a spoke node will only bridge traffic off the ring that has been tagged with its unique RVID.

Each of the spoke nodes perform MAC learning only for frames that carry a RVID assigned to that spoke node. Thus, MAC learning at the spokes is localized to clients directly attached to the spoke node, or to routes of interest to the spoke that pass through the hub. Similarly, the Hub node is not required to perform MAC learning on any of the spoke routes so that scalability of the hub node is increased.

To enable the Hub node to forward traffic to the spoke nodes on the ring, the hub node dynamically creates a binding between Customer VID (C-VID) and the RVID of the spoke node responsible for the C-VID. For traffic received from the ring, the hub node will assign a service identifier, i.e. I-SID, based on the pre-configured C-VID/RVID to service instance binding. When traffic is received for transmission onto the ring, the hub node will use the service identifier (e.g. I-SID) & C-VID to determine the RVID of the spoke node, and then use the C-VID & RVID to determine, from its forwarding database, which ring port should be used to output the frame. Before transmission, the hub node will insert the spoke's RVID into the frame to enable the spoke to receive the frame from the ring.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
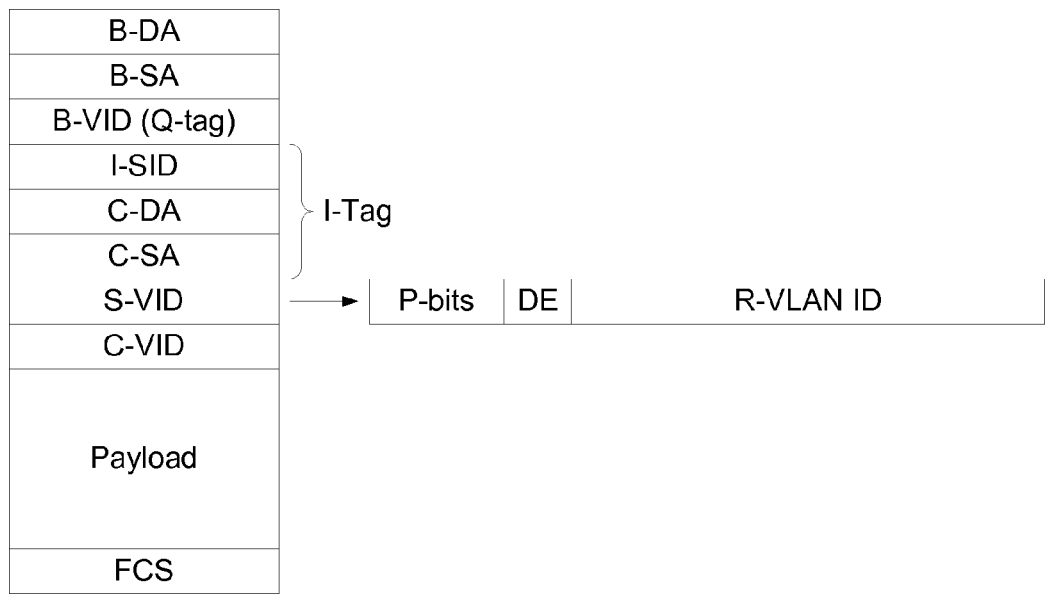
FIG. 1 is a functional block diagram of an Ethernet frame format.
Figure 2:
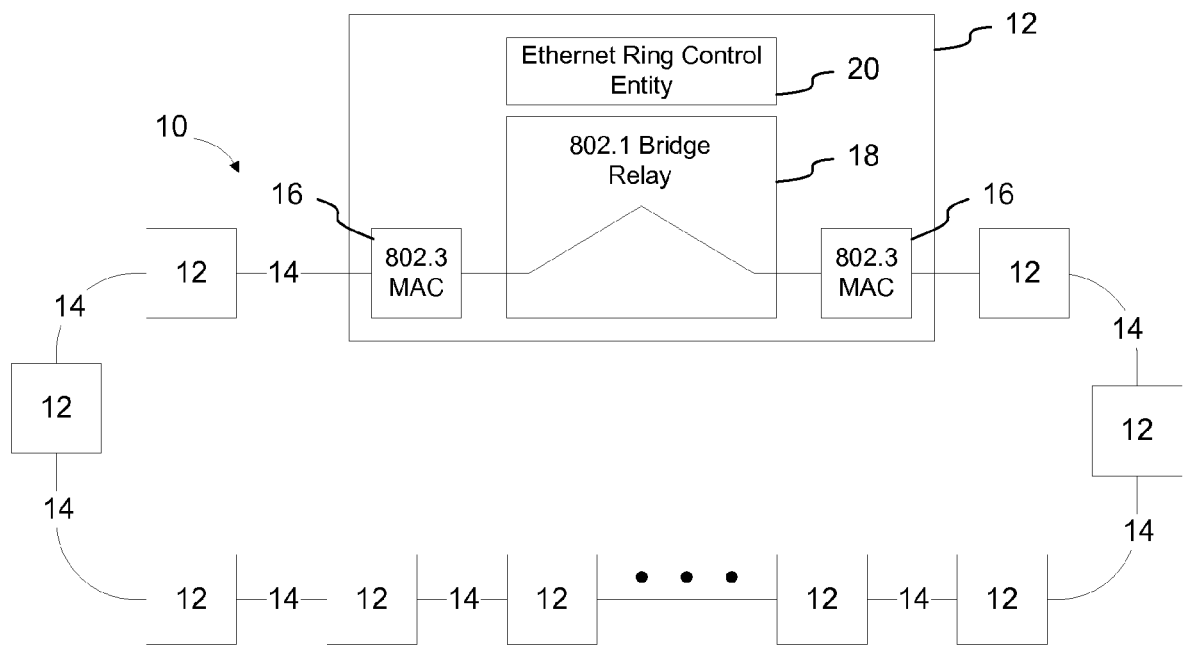
FIG. 2 is a functional block diagram of an example set of Ethernet nodes interconnected to form a closed loop.
Figure 3:
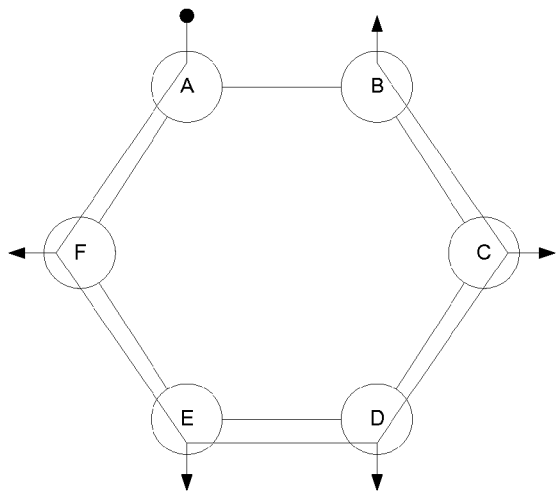
FIG. 3 is a functional block diagram of an Ethernet ring network implementing hub-and-spoke connectivity and showing the connectivity from the hub to each of the spokes.
Figure 4:
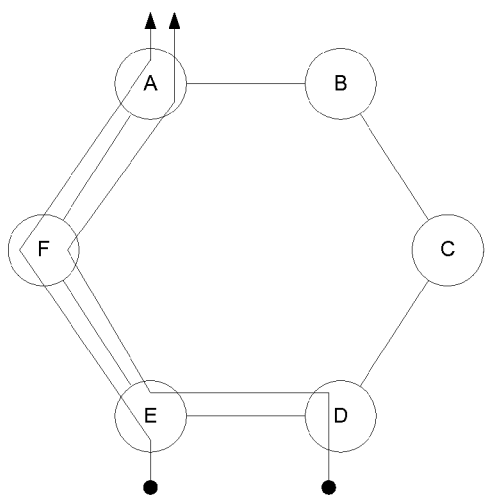
FIG. 4 is a functional block diagram of an Ethernet ring network implementing hub-and-spoke connectivity and showing the connectivity from a subset of the spokes to the hub.
Figure 5:
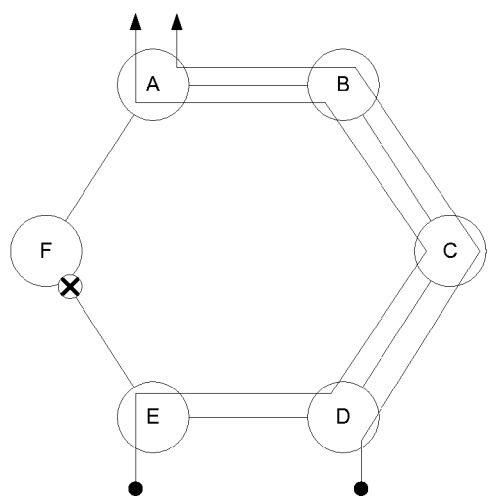
FIG. 5 is a functional block diagram of an Ethernet ring network implementing hub-and-spoke connectivity and showing the connectivity from a subset of the spokes to the hub with ring-blocking.

Hub-and-spoke connectivity allows a designed hub node to communicate to all other spoke nodes on the closed loop, while the other spoke nodes can only communicate with the hub node. Applications that could utilize this connectivity mode include Internet Access, Video Distribution, and other applications where it is desirable for one node to control communications between the other nodes, although other types of applications may similarly use this type of connectivity. For example, as illustrated in FIG. 3, hub node A can directly communicate with spoke nodes {B, C, D, E, F}. As shown in FIG. 4, however, spoke nodes {B, C, D, E, F} can only directly communicate with hub node A; the spoke nodes cannot communicate directly with each other via the hub. FIG. 5 shows connectivity where the blocking port on the ring is between the hub node and one of the spoke nodes. In this instance connectivity between the spoke node and hub node will extend around the ring in the other direction. Thus, hub-and-spoke connectivity may exist regardless of where the ring blocking port is located on the ring. Patent Ser. No. 12/027,942 explains ring blocking and the other aspects of the underlying ring control protocol.

Figure 6:
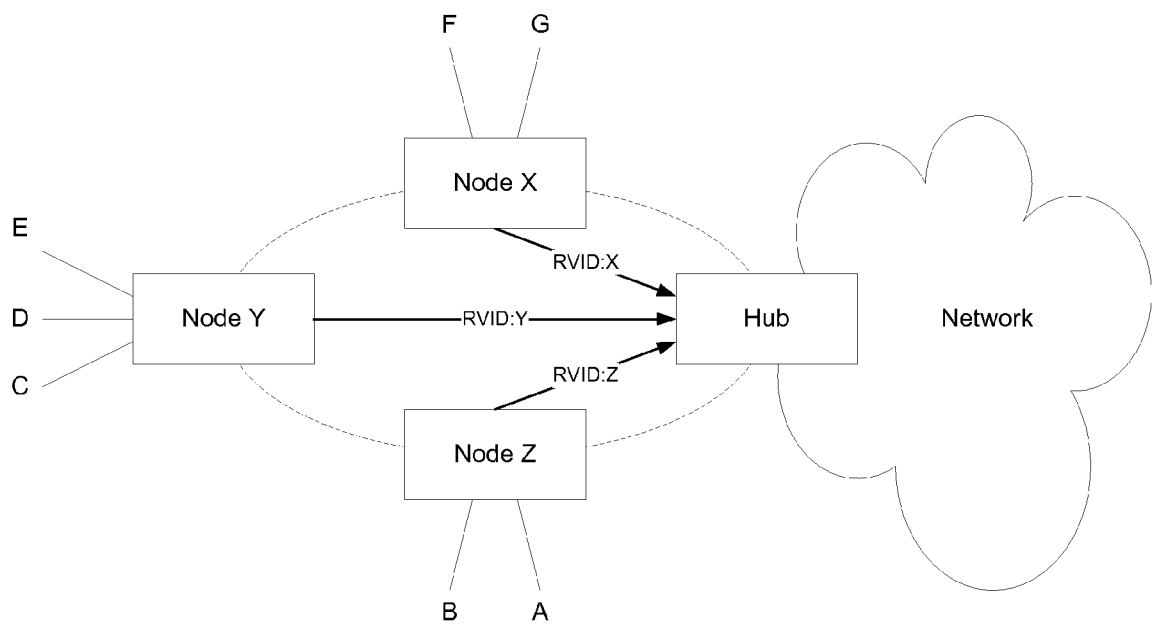
FIGS. 6-7 are functional block diagrams showing how RVIDs may be used to control dissemination of traffic on an Ethernet ring according to an embodiment of the invention.
Figure 7:
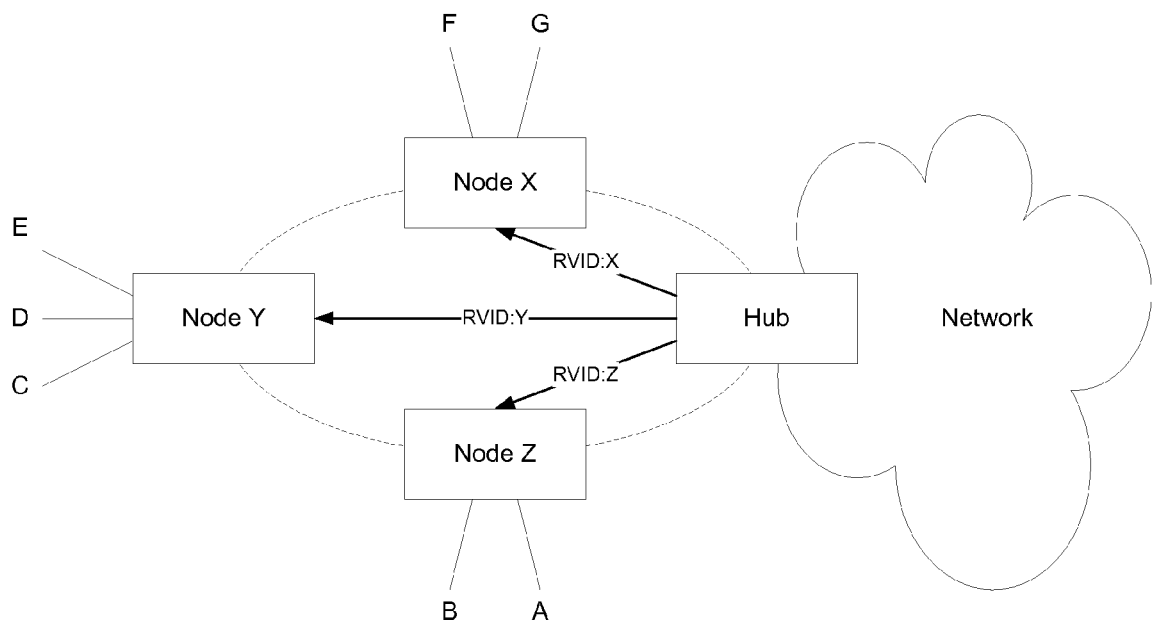

FIGS. 6 and 7 show an example of hub-and-spoke connectivity between a set of spoke nodes (nodes X, Y, Z) and a Hub node. As described in greater detail below, as the spoke nodes learn routes to attached clients, the spoke nodes will implement MAC learning for those routes to update their forwarding data bases. Thus, since Node X is attached to client route F, if node X receives a frame from client F, Node X will learn a route for client F on its associated port. In one embodiment, the node will insert the spoke RVID which has been assigned to it for all frames received on a client port, and perform MAC learning only for frames that contain the spoke RVID. By inserting the spoke RVID into the client frames as they are received, the spoke node is able to implement MAC learning of the client addresses.

Whenever a node has client frames to transmit on the ring, it will insert a VLAN ID into the Q-TAG which has been assigned to that particular node. Each spoke node will have a different VLAN-ID (RVID) assigned to it on the ring. The same RVID will be used to communicate from the spoke node to the hub, and from the hub to the spoke. The RVID assigned to the spoke node is used for unicast connectivity between the hub-and-spoke. Each spoke will have a different assigned RVID for use in connection with unicast connectivity. Since each spoke is assigned a unique RVID, not all nodes on the ring are required to participate in the hub-and-spoke connectivity model. Rather, the hub may elect to communicate with particular nodes on the ring and not communicate with other nodes on the ring. Similarly, not all traffic is required to be transmitted via the hub-and-spoke connectivity model, but rather this connectivity model may co-exist along with common meshed connectivity so that different traffic may selectively be transmitted either via hub-and-spoke or via meshed connectivity. Additionally, optionally, the hub node may have one or more RVIDs assigned to it that it can use to multicast traffic to its spoke nodes. In this embodiment, the spoke nodes will listen not only for their own spoke RVID but also for one or more of the hub-assigned multicast RVIDs.

802.1ad provides that a client frame may be tagged with two tags—a first Q-TAG containing a client assigned VLAN identifier (commonly called the C-VID) and a second Q-TAG containing a service-provider assigned VLAN identifier (commonly called the S-VID). Each of these VLAN identifiers is carried in a Q-tag which also includes several priority bits (p-bits) and a discard eligibility bit. 802.1ad is also referred to as Q-in-Q or provider bridging since it enables these two Q-tags to be added to the header of a standard 802.1 MAC header.

When a spoke node receives a frame from a customer port, the spoke node will add a VLAN identifier that has been assigned to it on the ring. This Ring VLAN ID (RVID) may be inserted into frame as the S-VID. Each spoke node on the ring will insert its own unique RVID into the Q-TAG of any frame that it transmits on the ring. The RVIDs are ring-unique, but are not required to be domain-wide unique since they are of local significance only. Spoke nodes on the ring will transparently bridge all frames on the ring regardless of the value of the Q-Tag, but will only bridge ring frames off of the ring onto a client port if the RVID value contained in the Q-Tag matches the RVID value assigned to that spoke node. Thus, node A, for example, will insert RVID:A into the Q-Tag of each frame transmitted on the ring, and will only bridge a frame received from one of its ring ports to a client port if the frame has a Q-Tag containing RVID:A. The node A may implement this using a VID filter at the client attachment interface of the spoke node, to prevent traffic from one spoke to be heard by another spoke.

The hub node will receive all frames tagged by any of its spoke nodes. Thus, the hub node filters traffic based on the RVID values of its spokes to obtain all frames transmitted by any of its spokes. Since the hub listens for particular RVID values, not every node on the ring is required to be part of the hub-and-spoke connectivity model. The hub node does not perform MAC learning on the client MAC addresses, but rather dynamically creates a binding between the C-VID, RVID and ring port. This enables the hub to perform learning based on C-VID rather than C-MAC to reduce the number of entries in the hub's forwarding database. By learning C-VID on a per RVID basis, different clients may utilize overlapping C-VID values without causing conflict in the hub FDB. Implementing C-VID learning, rather than CMAC learning, however, enables the hub to reduce the size of its FDB while still enabling the hub to forward spoke-destined traffic out the correct ring port to reduce the amount of traffic on the ring. If the hub receives traffic for transmission on the ring, and does not have an entry in its FDB for the frame, the hub may TX the frame in both directions onto the ring.

The hub node is also pre-configured to assign service identifiers (e.g. I-SIDs or pseudowire value in MPLS) to the traffic received from the ring network based on the C-VID and RVID, when the frames are to be transmitted by the hub off the ring onto an attached network. For example, where the hub performs MAC-in-MAC encapsulation specified in IEEE 802.1ah, the hub node will add another header including a provider destination MAC address (B-DA), provider source MAC address (B-SA), provider VLAN ID (B-VID), and an I-SID which may be used to specify the service instance. To implement this, the hub may be pre-configured with a database containing C-VID, RVID-I-SID bindings. Thus, when the hub receives a frame, it will read the C-VID and RVID to determine the I-SID, and use the I-SID and C-DA to determine the B-DA on the attached network. The hub will use its own MAC address as the B-SA, create the outer MAC header (B-DA, B-SA, B-VID, I-SID), and forward the frame on the attached network.

In the reverse direction, when a frame is received by the hub from the attached network, the hub node will read the I-SID to determine the service instance, and perform a lookup to determine the C-VID and RVID from the service instance. The hub node will then use the C-VID/RVID to perform a lookup in its forwarding database to determine which ring port should be used to forward the frame toward the spoke node on the ring. The hub node will then insert the spoke node RVID, and forward the frame out the correct port onto the ring network to enable the frame to be conveyed to the spoke node.

Nodes on the ring will filter frames based on RVID. If the RVID of a particular frame does not match their assigned RVID, the spoke node will bridge the frame around the ring, but won't perform MAC learning on the frame or forward the frame out any client port.

When a spoke node receives a frame containing an RVID that matches the spoke RVID, the spoke will read the C-MAC DA and optionally C-VID, perform a lookup in its forwarding database (FDB) and forward the frame out the correct client port. Where the spoke doesn't have an entry in its forwarding database for the source of the frame, the spoke node will also learn the source MAC address at the ingress port.

Figure 8:
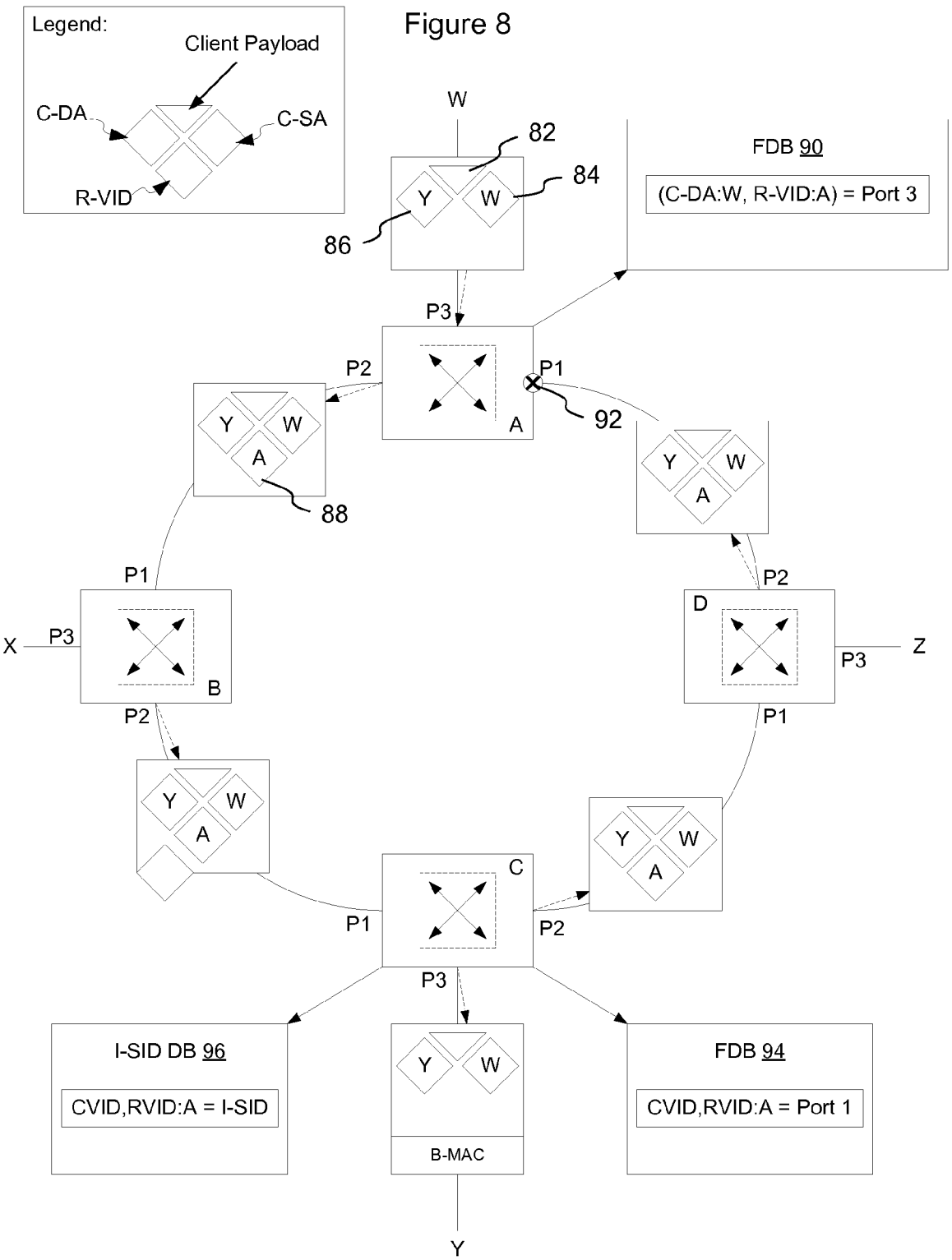
FIG. 8 is a functional block diagram showing the transmission of a frame from a spoke node to a hub node on an Ethernet ring according to an embodiment of the invention.

FIG. 8 shows a high-level walk-through of an example in which spoke node A receives a frame from client W on port P3. In this example, the frame 90 includes payload 82, client source address (S-DA:W) 84 and client destination address (C-DA:Y) 86. Node A in this example is implementing ring blocking on port P1 to prevent frames from looping on the ring.

As shown in FIG. 8, when node A receives the frame from client W on port P3, it will insert RVLAN ID (RVID:A) 88 into the frame and then update its Forwarding Data Base (FDB) 90 to include the entry (C-DA:W, RVID:A)=P3. Spoke node A will then transmit the frame which has been tagged with RVID:A onto the ring. Spoke node A will forward the frame to both ring ports (P1 and P2) to be forwarded but, since there is a ring blocking 92 on port P1, the frame will only be transmitted onto the ring on port P2.

When the frame is received at spoke node B on port P1, node B has been configured to not learn MAC addresses that aren't tagged with RVID:B, and also has been configured to not transmit frames out client ports that are tagged with any RVID not equal to RVID:B. Accordingly, spoke node B will not learn the MAC address of this frame nor transmit the frame on any client port. The node will, however, transmit the frame transparently around the ring and, hence, attempt to transmit the frame out ring port P2.

When the frame is received at the hub node C, the hub node will learn C-VID, RVID:A on port P1 and store that entry in its FDB 94. Since there was no matching entry in the FDB when the frame was received, the hub node will also transmit the frame back onto the ring on port P2. Spoke node D will receive the frame on port P1 and process the frame in a manner similar to spoke node B to cause the frame to be bridged out port P2 back to spoke node A. Spoke node A has a blocking port on port P1 and, hence, will cause the frame to be dropped at that point.

Returning back to hub node C, when hub node C receives a frame tagged with RVID:A, it will encapsulate the frame for transmission onto an external network to enable the frame to be forwarded off the ring network. A MAC-in-MAC encapsulation process may be used. During this process, the hub node will read the C-VID and RVID of the frame and use these values to perform a lookup in a service identifier database such as I-SID database 96 to determine the service identifier associated with the frame. In PB and PBB networks the I-SID may be used as the service identifier. In other networks the service identifier may be implemented using another value. For example, in MPLS a pseudowire label is commonly used as the service identifier. The service identifier database 96 will be pre-configured at the hub node C. Based on the service identifier, the hub node will determine the destination address of the frame on the external network (B-DA), create the B-MAC header, and forward the frame off the ring network onto the provider network.

Figure 9:
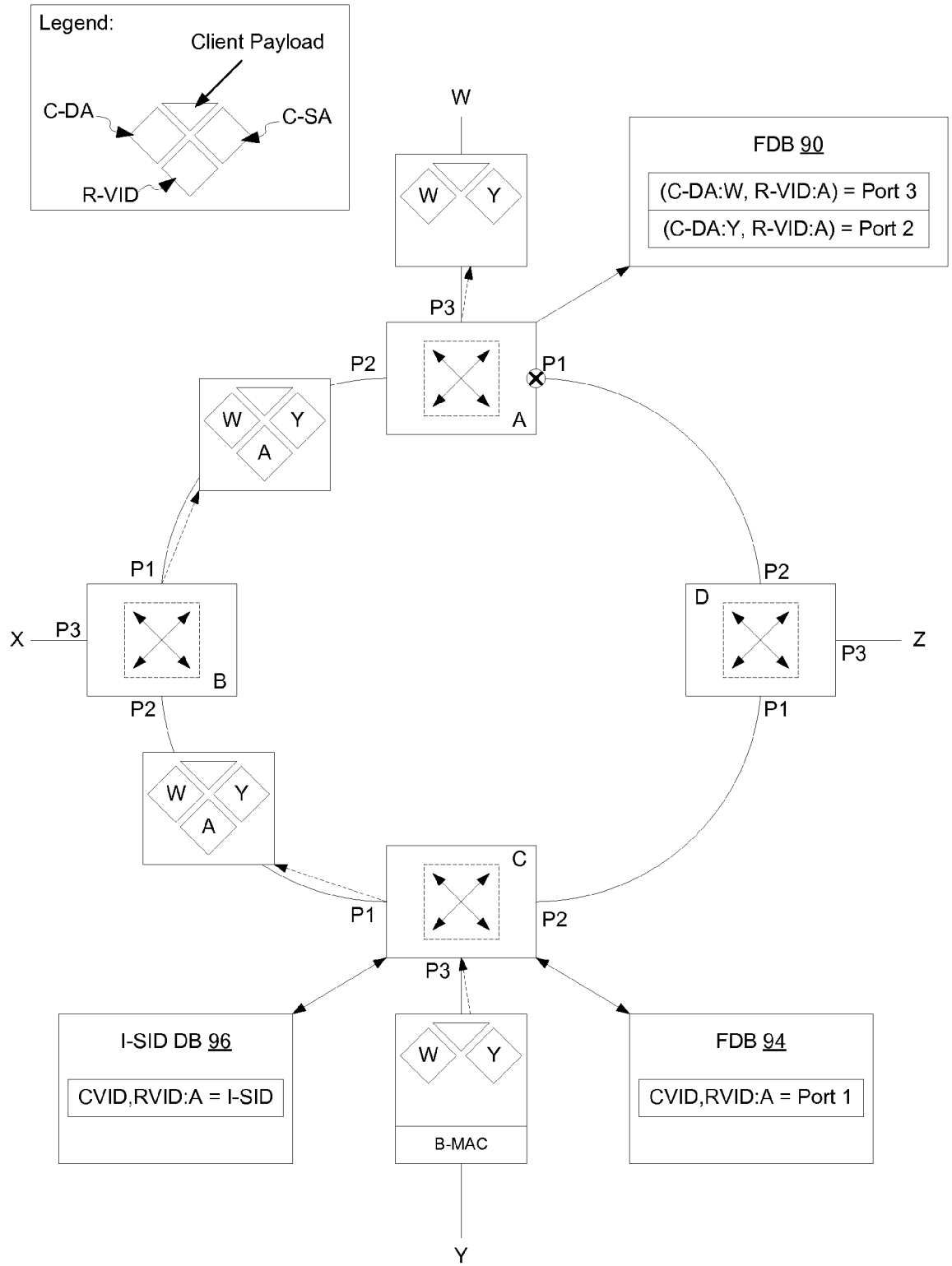
FIG. 9 is a functional block diagram showing the transmission of a frame from a hub node to a spoke node on an Ethernet ring according to an embodiment of the invention.

FIG. 9 illustrates the reverse process, in which a client frame 100 is transmitted from the hub to a spoke node. In this direction, when client Y transmits a frame 100 destined to client W (containing W's MAC address 102), the frame will be received at the hub node C. The hub node will read the service identifier (i.e. I-SID) and C-VID from the frame and use the C-VID,I-SID binding to determine the RVID from I-SID database 96. In this case the RVID that is associated with the binding is RVID:A so the hub node will insert RVID:A into the frame.

The hub node will thus perform a lookup in its forwarding database using the C-VID and RVID:A that was just assigned to the frame, to determine the output port on the ring. In this instance, the FDB includes an entry for the C-VID,RVID:A=port P1, so the hub node C will forward the frame over port P1. If the FDB does not contain an entry for the C-VID, RVID pair, the hub will transmit the frame out both ring ports. Note, in this regard, that the FDB lookup occurs after the RVID of the spoke has been inserted into the frame and is based on the C-VID,RVID pair of the frame. This enables the hub node to implement C-VID,RVID learning rather than CMAC learning as described above.

When spoke node B receives the frame it will read the RVID, and forward the frame onto the ring over port 1. Node B will not bridge the frame to any of its client ports or perform MAC learning based on the frame.

When the frame arrives at spoke node A, node A will read the RVID to determine that the frame contains an RVID that has been assigned to it (e.g. RVID:A). Accordingly, node A will perform MAC learning to a reverse route to the source MAC address (C-SA:Y) and learn C-DA:Y, RVID:A→port P2, which will be stored in its Forwarding Database. Spoke node A will also read the customer Destination MAC address (C-DA:W) and use the destination address along with the RVID value RVID:A to perform a lookup in its Forwarding database. In this instance C-DA:W,RVID:A maps to port P3, so spoke node A will forward the frame to client W on port P3.

As described above, to enable hub-and-spoke connectivity to be implemented in an Ethernet ring network implementing the ITU-T SG15/Q9 G.8032 protocol, the nodes are required to perform independent VLAN MAC learning, per-port VID filtering, and must support a FDB flush/clearing mechanism. The FDB flush cleaning mechanism enables the nodes to flush their databases when there is a change in the ring control protocol which may affect the direction on the ring over which a particular address is reachable. These mechanisms are well described in U.S. patent Ser. No. 12/027,942. In addition, according to an embodiment of the invention, the spoke nodes are required to implement MAC learning on a particular RVID which has been assigned to them for the particular hub-and-spoke connectivity. This enables the spokes to only perform MAC learning on routes that extend through the hub or on routes that are on off-ring interfaces.

At the hub, the hub node also is required to maintain a port binding table containing binding information between the (C-VID,RVID→port) for each C-VID, RVID pair. This enables the hub node to learn routes to the spoke nodes based on C-VID rather than C-MAC addresses, to reduce the number of entries in the hub forward database. Additionally, the hub node should be pre-configured with C-VID, RVID→service identifier bindings (e.g. I-SID bindings) to enable the hub to determine the correct service instance associated with the traffic when the traffic is to be transmitted off the ring.

The hub may have one or more additional RVID values that it may use to handle multicast traffic. In this embodiment, each spoke that is to participate in a particular multicast will be configured to receive traffic containing the multicast RVID as well as its own assigned RVID.

In the previous embodiment the spoke nodes performed C-MAC learning on their ports to enable traffic to be forwarded from the Ethernet ring network onto the customer networks. In another embodiment the spoke nodes do not perform C-MAC learning on the customer facing ports but rather use a unique RVID per customer facing port. In this embodiment each spoke port will be assigned a unique RVID and the spoke nodes will process any frames received on the Ethernet ring network containing an RVID identifying one of their ports. Avoiding CMAC learning is a requirement of particular types of services, such as E-line services. Thus, by implementing a separate RVID per customer facing port, the spoke nodes may enable this type of service to be offered on the Ethernet ring network.

In the previous description it was assumed that the ring network was single homed to the external client network. The two networks may be dual homed as well, and no modifications are believed necessary to the spoke nodes where the network is dual homed. However, minor adjustments should be made to the hub node to support dual homed ring network interconnection.

Where a network implementing a spanning tree and a closed loop network are connected with each other, each network will continue to implement its own control plane. Since the control plane of the network specifies how particular addresses are reachable on the network, where the two networks are connected at more than one place, the changes in one network may affect forwarding on the other connected network.

In a dual homed interconnection between the ring network and a spanning tree network, whenever the hub node sees a spanning tree topology change notification bridge protocol data unit (xSTP TCN BPDU), the hub node should clear its B-component (B-COMP) forwarding database. The B-Component is the logical bridge that adds the outer MAC header (B-MAC header) including the B-SA, B-DA, and B-VID. Since the xSTP TCN BPDU indicates that the provider network spanning tree is changing, causing the B-COMP to flush its FDB will enable the hub node to re-learn routes on the provider network. This enables the hub node to forward data over the newly configured spanning tree in the provider network.

Additionally, the hub node should transparently transport xSTP BPDUs over the ring using a dedicated RVID other than one of the RVIDs assigned to any of the spoke nodes. This enables the ring network to appear as a link in the spanning tree and prevents the spanning tree from interfering with the internal blocking mechanisms in place on the ring network.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for enabling an Ethernet ring to scalably support a hub-and-spoke connectivity model, the method comprising:
   receiving, from one of a plurality of spoke nodes by a hub node on the Ethernet ring at a first of two ports connected to the Ethernet ring, a first frame containing a source network address, a destination network address, a client virtual local area network (VLAN) identifier (C-VID) and a ring VLAN identifier (RVID), the destination network address identifying an external network address not located on the ring, and the RVID differing from a service instance tag (I-SID) and identifying one of the plurality of spoke nodes on the Ethernet ring;
   learning, by the hub node, the C-VID and the RVID from the first frame on the first of the two ports connected to the Ethernet ring without learning the first frame source network address at the first of the two ports connected to the Ethernet ring;
   assigning, by the hub node, the I-SID based on the received C-VID and RVID;
   determining which one of the two ports to be used for transmission based on the received C-VID and RVID;
   assigning, for traffic to be transmitted to at least one of the plurality of spoke nodes, a second RVID that differs from the RVID;
   inserting, by the hub node for traffic to be transmitted to at least one of the plurality of spoke nodes, the second RVID in the first frame;
   transmitting, by the hub node and the determined one of the two ports, to the at least one of plurality of spoke nodes the first frame with the inserted second RVID; and
   transmitting, by the hub, the first frame on an external network port off the Ethernet ring toward the destination network address, using the I-SID.

2. The method of claim 1, further comprising using the C-VID and RVID to perform a lookup in a service identifier database to determine a service identifier associated with the first frame.

3. The method of claim 2, wherein the service identifier is the I-SID.

4. The method of claim 2, further comprising using the service identifier associated with the first frame to determine a destination MAC address for the first frame on the external network, and applying an outer MAC header including the destination MAC address to the first frame prior to transmitting the first frame on the external network.

5. The method of claim 1, wherein not all traffic received by the hub node is associated with the hub-and-spoke connectivity model.

6. The method of claim 1, further comprising the hub node performing:
   receiving, on the external network port, a second frame addressed to the source network address of the first frame;
   determining from a second C-VID of the second frame and a service identifier of the second frame, an RVID of the spoke node;
   using the determined RVID and the second C-VID of the second frame to determine an Ethernet ring port to use to transmit the frame on the Ethernet ring network; and
   inserting the RVID into the frame before transmitting the second frame on the Ethernet ring network;

wherein the same RVID value is used to transmit frames to the spoke nodes as are used by the spoke nodes to transmit frames to the hub node.

7. The method of claim 6, wherein a different RVID uniquely identifies each of the spoke nodes on the Ethernet ring.

8. The method of claim 6, wherein the service identifier of the second frame is an I-SID.

9. The method of claim 6, wherein the RVID is inserted into an S-VID field of a MAC header associated with the second frame.

10. A method for enabling an Ethernet ring to scalably support a hub-and-spoke connectivity model, the method comprising:
 receiving, by a spoke node on the Ethernet ring at a client port, a first frame containing a client source network address, a client destination network address, and client virtual local area network (VLAN) identification (C-VID);
 inserting, by the spoke node, a ring VLAN identification (RVID) into the frame uniquely identifying the spoke node within the hub- and-spoke connectivity model on the Ethernet ring, the RVID differing from a service instance tag (I-SID);
 learning, by the spoke node, the client source network address on the client port;
 transmitting, by the spoke node, the frame on at least one Ethernet ring network port to
 enable the frame to be forwarded toward a hub node located on the Ethernet ring; and
 assigning, by the hub node, the (I-SID) based on the C-VID and RVID of the first frame.

11. The method of claim 10, wherein the destination network address identifies an external network address not located on the ring.

12. The method of claim 10, wherein the spoke node inserts the RVID uniquely identifying the spoke node within the hub-and-spoke connectivity model on the Ethernet ring into the first frame prior to learning the client source network address on the client port.

13. The method of claim 12, wherein learning comprises performing MAC learning on the client port.

14. The method of claim 13, wherein the spoke node only performs MAC learning for frames containing the RVID uniquely identifying the spoke node within the hub- and-spoke connectivity model on the Ethernet ring.

15. The method of claim 10, further comprising applying a VID filter at the client port to select frames received via one of the Ethernet ring network ports to be forwarded out client ports that contain the RVID uniquely identifying the spoke node within the hub-and-spoke connectivity model on the Ethernet ring.

16. The method of claim 15, further comprising applying a VID filter at the client port to select frames received via one of the Ethernet ring network ports to be forwarded out client ports that contain an RVID assigned by the hub node to be used for multicast connectivity within the hub-and-spoke connectivity model on the Ethernet ring.

17. The method of claim 10, further comprising receiving a second frame on one of the Ethernet ring network ports.

18. The method of claim 17, further comprising forwarding the second frame out another of the Ethernet ring network ports without performing MAC learning on the second frame and without forwarding the frame out any client ports if the second frame does not contain the RVID uniquely identifying the spoke node within the hub-and-spoke connectivity model on the Ethernet ring.

19. The method of claim 17, further comprising forwarding the second frame out one of the client ports if the second frame contains the RVID uniquely identifying the spoke node within the hub-and-spoke connectivity model on the Ethernet ring.

20. A hub node on an Ethernet ring for enabling the Ethernet ring to scalably support a hub-and-spoke connectivity model, the hub node comprising:
 a first port connected to an Ethernet ring, the first port configured to receive a first frame containing:
  a source network address,
  a destination network address,
  a client virtual local area network (VLAN) identifier (C-VID), and
  a ring VLAN identifier (RVID), wherein the destination network address identifies an external network address not located on the Ethernet ring, and the RVID differs from a service instance tag (I-SID) and identifies a spoke node on the Ethernet ring;
 a learning component connected to the first port, the learning component configured to learn the C-VID and the RVID from the first frame without learning the source network address;
 an addressing component configured to assign the I-SID based on the learned C-VID and RVID, and to assign a second RVID that differs from the RVID and insert the second RVID in the first frame if the first frame is to be transmitted to the spoke node;
 an external port not connected to the Ethernet ring; and
 a transmitter connected to the external port, the transmitter configured to transmit the first frame on the external port toward the destination network address using a pre-configured service identifier.

* * * * *